(12) United States Patent
Yamamoto et al.

(10) Patent No.: US 6,562,519 B2
(45) Date of Patent: May 13, 2003

(54) MICROPOROUS FILM

(75) Inventors: Kazushige Yamamoto, Osaka (JP); Shunsuke Noumi, Osaka (JP); Mutsuko Yamaguchi, Osaka (JP); Hideyuki Emori, Osaka (JP); Yoshihiro Uetani, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/748,382

(22) Filed: Dec. 27, 2000

(65) Prior Publication Data

US 2001/0005563 A1 Jun. 28, 2001

(30) Foreign Application Priority Data

Dec. 27, 1999 (JP) .......................................... 11-369293

(51) Int. Cl.7 ................................................. H01M 2/16
(52) U.S. Cl. ........................ 429/247; 429/129; 429/249
(58) Field of Search ................................ 429/247, 129, 429/249

(56) References Cited

U.S. PATENT DOCUMENTS

| 4,620,956 A | | 11/1986 | Hamer ........................ 264/145 |
| 4,699,857 A | * | 10/1987 | Giovannoni et al. ......... 429/204 |
| 5,425,865 A | * | 6/1995 | Singleton et al. ...... 204/157.15 |
| 5,691,005 A | | 11/1997 | Morigaki et al. ........... 427/508 |

FOREIGN PATENT DOCUMENTS

| EP | 0 765 900 A1 | 4/1997 |
| EP | 0 814 117 A1 | 12/1997 |

\* cited by examiner

*Primary Examiner*—Laura Weiner
(74) *Attorney, Agent, or Firm*—Sughrue Mion, PLLC

(57) ABSTRACT

A microporous film which is excellent in permeability and mechanical strength and has breakage resistance at high temperatures; a separator for a nonaqueous-electrolyte battery which comprises the microporous film; and a nonaqueous-electrolyte battery employing the separator. The microporous film has a gel content of from 20 to 90% as determined through 3-hour immersion in boiling xylene.

3 Claims, No Drawings

MICROPOROUS FILM

FIELD OF THE INVENTION

The present invention relates to a microporous film. More particularly, the invention relates to a microporous film having excellent heat resistance, a separator for a nonaqueous-electrolyte battery which comprises the microporous film, and a nonaqueous-electrolyte battery employing the separator.

DESCRIPTION OF THE RELATED ART

Nonaqueous-electrolyte batteries employing a light metal such as lithium as an electrode have a high energy density and are reduced in self discharge, and the range of applications thereof has hence widened considerably in the trend toward performance advancement and size reduction in electronic apparatus, etc. As the electrodes of such nonaqueous-electrolyte batteries is used a spirally wound structure which is formed by superposing a positive electrode, a negative electrode, and a separator each in a strip form and coiling them together. Because of this constitution, a wide effective electrode area is ensured. The separator basically functions to prevent short-circuit between the electrodes and to allow ions to pass therethrough due to its microporous structure and thereby enable cell (battery) reactions. However, from the standpoint of safety improvement, separators having the so-called shutdown (SD) mechanism are used in which if an abnormal current flows due to erroneous connection, etc., the resin thermally deforms and the micropores are closed with increasing temperature in the cell to thereby stop the cell reactions.

Known as separators having such an SD function are, for example, microporous polyethylene films and microporous films having a multilayer structure comprising a polyethylene layer and a polypropylene layer However, as a result of recent progress in lithium ion secondary batteries and the like, the separators have come to be required to not only have the shutdown function but satisfy a requirement concerning heat resistance. Specifically, the separators are desired to cope with higher temperatures because there may be cases where a further increase in temperature after shutdown causes the separator itself to suffer meltdown or to be plasticated and break. In particular, since the number of factors contributing to heat generation increases with increasing capacity and reducing internal resistance in batteries, heat resistance becomes increasing important.

In view of the problem described above, JP-A-63-308866 (the term "JP-A" as used herein means an "unexamined published Japanese patent application") discloses a method for obtaining a microporous film having high strength and excellent high-temperature properties by superposing a film of low-melting polyethylene and a film of high-melting polypropylene. However, this separator has increased internal resistance due to the layered structure and is hence unsuitable for use as a separator for high-performance batteries such as those for use in high-output applications. In JP-A-10-298325 is disclosed a method for obtaining a microporous film comprising a high-molecular polyethylene composition containing low-molecular polyethylene and polypropylene. However, this microporous film is still insufficient in that there may be cases where heat resistance higher than that of polypropylene is required for an abrupt temperature increase, and that there is a possibility that even a separator which itself has excellent heat resistance might break when its mechanical strength is low, because it receives a high pressure upon thermal abrupt gasification of the internal electrolyte. For example, the low-boiling electrolytes in frequent use include dimethoxyethane (boiling point, 83° C.), dimethyl carbonate (boiling point, 90° C.), methyl ethyl carbonate (boiling point, 107° C.), and diethyl carbonate (boiling point, 126° C.). When such a electrolyte is used, a gas pressure is applied to the separator at 150° C., which is a temperature used for battery evaluation in a safety test.

SUMMARY OF THE INVENTION

An object of the invention is to provide, in view of the problems described above, a microporous film which is excellent in permeability and mechanical strength and has breakage resistance at high temperatures, a separator for a nonaqueous-electrolyte battery which comprises the microporous film, and a nonaqueous-electrolyte battery employing the separator.

The present inventors made intensive investigations in order to eliminate the problems described above. As a result, they have found that a microporous film having a gel content of from 20 to 90% as determined through 3-hour immersion in boiling xylene has not only heat resistance but excellent mechanical strength and is hence suitable for use as a separator for a nonaqueous-electrolyte battery. The invention has been achieved based on this finding.

The invention provides:

[1] A microporous film having a gel content of from 20 to 90% as determined through 3-hour immersion in boiling xylene;

[2] A separator for a nonaqueous-electrolyte battery which comprises the microporous film described in [1] above; and

[3] A nonaqueous-electrolyte battery employing the separator described in [2] above.

DETAILED DESCRIPTION OF THE INVENTION

The microporous film of the invention has a gel content of from 20 to 90% as determined through 3-hour immersion in boiling xylene. Because the film has a gel content within that range, it produces an effect that film breakage resistance is obtained in which the heat resistance and excellent mechanical strength attributable to the crosslinked structure are maintained even at high temperatures and high pressures. The gel content of the film is preferably from 25 to 85%, more preferably from 30 to 85%, most preferably from 35 to 80%. The lower limit of the gel content thereof is 20% from the standpoint of obtaining a separator having sufficient heat resistance. The upper limit thereof is 90% from the standpoint of attaining sufficient SD. The values of gel content herein are obtained by the method of measurement described in the Examples which will be given later.

The microporous film of the invention preferably comprises resin having a crosslinked structure. The resin desirably comprises a blend of two or more polymers from the standpoint that the microporous film made of a polymer blend can be efficiently and stably made to have properties such as excellent permeability, high mechanical strength, and excellent high-temperature breakage resistance. Examples of polymers usable for the microporous film include crosslinkable ingredients which impart a crosslinked structure to the microporous film, and further include other resin ingredients. Desirable as the crosslinkable ingredients imparting a crosslinked structure to the microporous film are unsaturated compounds. Especially preferred of these is a polymer formed by the ring-opening polymerization of either an unsaturated condensed alicyclic compound or a derivative thereof, because the backbone of this polymer has aliphatic rings and double bonds both derived from the monomer and, hence, the efficient formation of a crosslinked structure and an improvement in the heat resistance of the microporous film to be obtained can be expected. The polymer formed by ring-opening polymerization may be one in which the double bonds have been partly hydrogenated.

Examples of the unsaturated condensed alicyclic compound are roughly divided into the following three groups. The first group includes unsaturated compounds which are classified as condensed alicyclic compounds in a narrow sense and have, in one of the rings, a double bond to be incorporated into the backbone to be formed therefrom through ring-opening polymerization. Also usable as the unsaturated condensed alicyclic compounds are derivatives formed by replacing some of the hydrogen atoms of those unsaturated compounds with substituents. Examples thereof include bicyclo[3.2.0]hept-6-ene, bicyclo[4.2.0]oct-7-ene, and derivatives thereof.

The second group includes unsaturated compounds which are classified as bridge-ring compounds and have, in one of the rings, a double bond to be incorporated into the backbone to be formed therefrom through ring-opening polymerization. Also usable as the unsaturated condensed alicyclic compounds are derivatives formed by replacing some of the hydrogen atoms of those unsaturated compounds with substituents. Examples thereof include bicyclo[2.2.1]hept-5-ene (referred to also as norbornene in this specification) and norbornene derivatives such as the methyl ester of bicyclo[2.2-1]hept-5-ene-2,3-dicarboxylic acid, and further include bicyclo[2.2.2]oct-2-ene and derivatives thereof.

The third group includes bridge-ring compounds which have a condensed aliphatic ring and give, through ring-opening polymerization, a backbone having aliphatic rings and double bonds. Examples thereof include tricyclo[5.2.1 $0^{2.6}$]deca-3,8-diene (dicyclopentadiene), tetracyclododecene, and derivatives of these.

Preferred of those unsaturated condensed alicyclic compounds are norbornene and norbornene derivatives from the standpoints of starting material availability, etc. Those unsaturated condensed alicyclic compounds can be subjected to ring-opening polymerization singly or as a mixture of two or more thereof or successively.

Preferred polymers formed by the ring-opening polymerization of those unsaturated condensed alicyclic compounds are polynorbornenes and the like. More preferred of these from the standpoint of discersibility is a polynorbornene rubber having a high average molecular weight.

Such a crosslinkable ingredient, which imparts a crosslinked structure to a microporous film, is incorporated in an amount of preferably from 1 to 50% by weight, more preferably from 1 to 35% by weight, based on all resin ingredients. The lower limit of the amount of the crosslinkable ingredient to be incorporated is 1% by weight from the standpoint of obtaining a separator having sufficient heat resistance. The upper limit thereof is 50% by weight from the standpoint of maintaining the properties required of separators for nonaqueous-electrolyte batteries.

Examples of the other resin ingredients include polyolefins and thermoplastic elastomers. Examples of the polyolefins include polyolefin resins such as polyethylene and polypropylene and modified polyolefin resins such as ethylene/acrylic monomer copolymers and ethylene/vinyl acetate copolymers. Examples of the thermoplastic elastomers include polystyrene, polyolefin, polydiene, vinyl chloride, and polyester elastomers. Preferred of these are polyolefin resins. Especially preferred is an ultrahigh-molecular polyolefin having a molecular weight of 500,000 or higher.

These resin ingredients can be used alone or as a mixture of two or more thereof. The amount of these resin ingredients incorporated in the microporous film is preferably from 50 to 99% by weight, more preferably from 65 to 99% by weight, based on the film. The lower limit of the amount thereof is 50% by weight from the standpoint of maintaining even micropores and mechanical strength. The upper limit thereof is 99% by weight from the standpoint of forming a crosslinked structure which imparts heat resistance.

Processes for producing the microporous film of the invention will be explained below.

For producing the microporous film of the invention, known methods can be used, such as a dry film-forming method and a wet film-forming method. For example, the microporous film can be produced by mixing a resin composition comprising at least the two kinds of polymers described above with a solvent, forming the mixture into a sheet while kneading and thermally melting the mixture, rolling the sheet, stretching the same at least uniaxially, and removing the solvent by extraction.

Examples of the solvent include aliphatic or cyclic hydrocarbons, such as nonane, decane, undecane, dodecane, decalin, and liquid paraffins, and mineral oil fractions having a boiling point close to those of these hydrocarbons. Preferred are nonvolatile solvents containing a large proportion of alicyclic hydrocarbons, such as a liquid paraffin. The solvent is used preferably in an amount of from 60 to 95% by weight based on the mixture of the resin composition and the solvent. The step in which the mixture of the resin composition and the solvent is kneaded and formed into a sheet can be conducted by a known method. For example, the mixture may be batchwise kneaded with a Banbury mixer, kneader, or the like and then formed into a sheet by sandwiching the kneaded mixture between cooled metal plates and thereby rapidly cooling it to cause crystallization. Alternatively, the mixture may be formed into a sheet with, e.g., an extruder equipped with a T-die or the like. Although the kneading is not particularly limited as long as it is conducted at an appropriate temperature, it is preferably conducted at from 100 to 200° C.

The thickness of the sheet thus obtained is not particularly limited. However, the thickness thereof is preferably from 3 to 20 mm. The thickness thereof maybe reduced to 0.5 to 2 mm by rolling such as hot pressing. The temperature for this rolling is preferably from 100 to 140° C.

Methods for stretching the sheet are not particularly limited, and use may be made of ordinary tentering, rolling, or inflation or a combination of two or more of these. The stretching may be conducted uniaxially, biaxially, etc. In the case of biaxial stretching, machine-direction stretching and transverse-direction stretching may be conducted either simultaneously or successively. The stretching is preferably conducted at a temperature of from 100 to 140° C.

The treatment for solvent removal is a step in which the solvent is removed from the sheet to thereby form a microporous structure. This step can be accomplished, for example, by washing the sheet with an extraction solvent to thereby remove the residual solvent. Examples of the extraction solvent include readily volatile solvents, e.g., hydrocarbons such as pentane, hexane, heptane, and decane, chlorinated hydrocarbons such as methylene chloride and carbon tetrachloride, fluorinated hydrocarbons such as trifluoroethane, and ethers such as diethyl ether and dioxane. These extraction solvents can be used alone or as a mixture of two or more thereof. Methods for the washing with such an extraction solvent are not particularly limited, and examples thereof include a method in which the sheet is immersed in an extraction solvent to extract the residual solvent and a method in which the sheet is showered with an extraction solvent.

By such known methods, the resin composition is formed into a sheet and a microporous film is obtained therefrom. Thereafter, the resin composition constituting this microporous film is preferably crosslinked. For the crosslinking can be used at least one member selected from the group consisting of heat, ultraviolet, and electron beams. This crosslinking eliminates all or part of the double bonds derived from the unsaturated compound. From the standpoint of the structural stability of the microporous film, heat is desirable among those means for crosslinking. By this crosslinking, the heat resistance (breakage resistance at high temperatures) of the microporous film is greatly improved.

In the case where heat is used as a means for the crosslinking, this crosslinking may be conducted by any of a one-stage heat treatment method in which the film is treated by one heating operation, a multistage heat treatment method in which the film is heated first at a low temperature and then at a higher temperature, and a temperature-rising heat treatment method in which the film is heat-treated while elevating the temperature. It is, however, desirable to treat the microporous film in such a manner as not to impair the properties, e.g., air permeability, originally possessed by the microporous film. In the case of the one-stage heat treatment, it is preferred to use a temperature of from 40 to 140° C., although the temperature varies depending on the composition of the microporous film. When a heat treatment is initiated at a low temperature and the temperature is elevated thereafter, then the heat resistance of the microporous film gradually improves with curing. Consequently, in this method, the film becomes capable of being exposed to a high temperature while preventing the original properties, e.g., air permeability, from being impaired by the heating. It is therefore preferred to employ the multistage or temperature-rising heat treatment method from the standpoint of completing the heat treatment in a short time without impairing properties.

In the case of the multistage heat treatment method, the temperature for a first-stage heat treatment is preferably from 40 to 90° C., although it varies depending on the composition of the microporous film. The temperature for a second-stage heat treatment is preferably from 90 to 140° C., although it varies depending on the composition of the microporous film. If desired, third-stage and subsequent heat treatments may be conducted at a higher temperature for a shorter period. Although the period for each treatment varies depending on the composition of the microporous film, the period for the first heat treatment is preferably about from 3 to 48 hours and that for the second-stage heat treatment, which is conducted at a higher temperature, is preferably about from 0.5 to 6 hours. The temperature-rising heat treatment method may be conducted under conditions similar to those for the multistage heat treatment method.

In the case of using ultraviolet, crosslinking can be conducted, for example, in the following manner. The microporous film obtained is irradiated with a mercury lamp either as it is or after having been immersed in a methanol solution of a polymerization initiator and dried for solvent removal.

In the case of using electron beams, the microporous film obtained is irradiated with electron beams at a radiation dose of, e.g., from 0.1 to 10 Mrad. The atmosphere for irradiation may be air as in the treatment with heat, or may be an inert gas atmosphere such as nitrogen or argon gas so as to control the crosslinking.

Subsequently to the crosslinking step, the microporous film may generally be heat-set in order to prevent thermal shrinkage. In particular, when the crosslinking with heat as described above is conducted in the invention, this crosslinking treatment can serve also as substantial heat setting depending on the conditions for the treatment. However, in the case where the thermal crosslinking is insufficient as heat setting, the microporous film which has undergone the crosslinking may be further heated to conduct heat setting in order to more effectively prevent thermal shrinkage. This heat setting may be conducted at a temperature of, e.g., from 110 to 140° C. for about from 0.5 to 2 hours.

By regulating the temperature, period, and other conditions for the crosslinking, the degree of crosslinking can be varied and the gel content of the microporous film can be regulated.

From the standpoint of use as a separator for a nonaqueous-electrolyte battery, the microporous film of the invention thus obtained preferably has such mechanical strength that the modulus of elasticity thereof as measured at 150° C. is from $1 \times 10^6$ to $1 \times 10^8$ Pa. More preferably, the modulus of elasticity thereof is from $2 \times 10^6$ to $9 \times 10^7$ Pa. The temperature of 150° C. is generally employed in high-temperature tests including the hot box test. The lower limit of the modulus of elasticity of the microporous film is preferably $1\times10^6$ Pa from the standpoint of enabling the separator to withstand the temperature in the battery and the pressure or the electrolyte vapor. The upper limit thereof is preferably $1\times10^8$ Pa from the standpoint of enabling the film to flexibly cope with temperature changes so as to be reduced in deformation. The values of modulus of elasticity herein are obtained by the method of measurement described in the Examples which will be given later.

The thickness of the microporous film is preferably from 1 to 60 μm, more preferably from 5 to 50 μm. The air permeability thereof is preferably from 100 to 1,000 sec/100 cc, more preferably from 100 to 900 sec/100 cc. The SD temperature thereof is preferably 150° C. or lower, more preferably 145° C. or lower.

The microporous film of the invention described above is expected to improve safety when used as, e.g., a separator for a nonaqueous-electrolyte battery or electrolytic capacitors because the film, under high-temperature conditions, not only has heat resistance in itself but does not readily break even under the pressure of the inside vaporized electrolyte.

The nonaqueous-electrolyte battery of the invention is not particularly limited as long as it employs the microporous film described above as a separator. The structure and constituent materials of the battery and the production method therefor and others may be the same as those for ordinary nonaqueous-electrolyte batteries without particular limitations. This nonaqueous-electrolyte battery is highly safe because it employs the microporous film of the invention.

The invention will be explained below in more detail by reference to Examples and Comparative Examples, but the invention should not be construed as being limited by these Examples in any way. The following test methods were used in the Examples.

(Film Thickness)

Measured with a 1/10,000 thickness gauge and on a scanning electron photomicrograph (×10,000) of a section of the microporous film.

(Air Permeability)

Measured in accordance with JIS P8117.

(Shutdown Temperature)

A cell made of SUS was used which had a sealable cylindrical test chamber having a diameter of 25 mm. Two platinum disks (thickness, 1.0 mm) respectively having diameters of 20 mm and 10 mm were used as a lower and an upper electrode, respectively. A 24-mmφ microporous film sample obtained through punching was immersed in an electrolyte to infiltrate the electrolyte thereinto and then sandwiched between the electrodes. The resultant assemblage was set in the cell. Each electrode was pressed with a spring attached to the cell so that a given planar pressure was applied to the sample. The electrolyte used was a solution prepared by dissolving lithium borofluoride in a concentration of 1.0 mol/l in a solvent consisting of a 1:1 by volume mixture of propylene carbonate and dimethoxyethane.

To this cell were connected a thermocouple thermometer and an ohmmeter so that temperature and resistance could be measured The cell was placed in a 180° C. thermostatic chamber to measure the temperature and resistance of the cell. The average rate of temperature rising from 100° C. to 150° C. was 10° C./min. The temperature at which the resistance reached 100 Ω·cm² in this measurement was taken as shutdown temperature.

(Gel Content)

A microporous film produced was cut into a square of 4 cm×4 cm and sandwiched between a folded metal gauze of 5 cm×10 cm to obtain a sample 5 cm square. The initial weight of this sample was measured, and the sample was immersed in 100 ml of m-xylene (boiling point, 139° C.) This xylene was heated and kept boiling for 3 hours. Thereafter, the sample was taken out, subsequently rinsed and dried, and then weighed. From the resultant weight change, the gel content R (%) was determined.

$$R(\%)=100\times P1/P0$$

(P0: initial weight, P1: weight after treatment with boiling xylene)

(Modulus of Elasticity)

A microporous film sample in the form of strip (length, 40 mm; width, 10 mm; thickness, 20-30 μm) was prepared. Spectrometer SDM 5600 for viscoelastic examination, manufactured by Seiko Instruments Inc., was used to examine the sample under the conditions of a heating rate of 5° C./min and a frequency of 10 Hz. The value of storage elastic modulus at 150° C. was determined from the thus-obtained elasticity graph and taken as the modulus of elasticity.

(Thermal Film Breakage)

A cell made of SUS was used which had a sealable cylindrical test chamber having a diameter of 25 mm. On a lower platinum plate (thickness, 1.0 mm) were placed a ring-form fluororesin (thickness, 0.5 mm) having an inner diameter of 10 mm and an outer diameter of 20 mm and a negative electrode (thickness 0.4 mm) impregnated with an electrolyte. A 24-mmφ microporous film sample obtained through punching was impregnated with the electrolyte by immersion therein and placed on the negative electrode. Thereon were placed a ring-form fluororesin having the same shape as that fluororesin ring and an upper platinum plate (thickness, 1.0 mm). The resultant assemblage was set in the cell. Each platinum plate was pressed with a spring attached to the cell so that a given planar pressure was applied. The electrolyte used was a solution prepared by dissolving lithium borofluoride in a concentration of 1.0 mol/l in a solvent consisting of a 1:1 by volume mixture of propylene carbonate and dimethoxyethane (boiling point, 83° C.).

The negative electrode used had been produced in the following manner. A carbon material having an average particle diameter of 10 μm was mixed with a solution of vinylidene fluoride in N-methylpyrrolidone to prepare a slurry. This negative-electrode material mixture slurry was filtered through a 70-mesh screen to remove coarse particles. Thereafter, the slurry was evenly applied to both sides of a negative-electrode collector consisting of a copper foil strip having a thickness of 18 μm and then dried. This coated copper foil was pressed with a roller press and cut to produced the negative electrode.

The cell was heated at an average temperature rising rate of 5° C./min, subsequently held at 150° C. for 1 hour, and then rapidly cooled. Thereafter, the separator was visually examined for film breakage.

EXAMPLE 1

Twenty parts by weight of a polymer composition consisting of 20% by weight powdery polymer formed by the ring-opening polymerization of norbornene (manufactured by Nippon Zeon Co. Ltd. trade name, Norsorex NB; weight-average molecular weight, 2,000,000 or higher; the same applies hereinafter), 20% by weight polyethylene having a weight-average molecular weight of 300,000, and 60% by weight ultrahigh-molecular polyethylene having a weight-average molecular weight of 3,000,000 was mixed with 80 parts by weight of a liquid paraffin (solidifying point, −15° C.; dynamic viscosity at 40° C., 59 cSt; the same applies hereinafter) to prepare a homogeneous slurry. This slurry was kneaded with a small kneader at a temperature of 160° C. for about 60 minutes while melting the polymers. The resultant kneaded mixture was sandwiched between metal plates cooled at 0° C. to thereby form the mixture into a sheet while rapidly cooling it. This resin sheet was hot-pressed at a temperature of 115° C. until the sheet thickness decreased to 0.4 to 0.6 mm, and then biaxially stretched at a temperature of 115° C. simultaneously in the machine and transverse directions 3.5 times each. The stretched sheet was subjected to a solvent extraction with heptane. The microporous film thus obtained was heat-treated in air first at 85° C. for 6 hours and then at 110° C. for 2 hours to obtain a microporous film according to the invention.

EXAMPLE 2

Twenty parts by weight of a polymer composition consisting of 12% by weight powdery polymer formed by the ring-opening polymerization of norbornene, 15% by weight thermoplastic olefin elastomer (manufactured by Sumitomo Chemical Co., Ltd.; trade name, TPE 821; softening point, 102° C.) and 73% by weight ultrahigh-molecular polyethylene having a weight-average molecular weight of 3,000,000 was mixed with 80 parts by weight of a liquid paraffin to prepare a homogeneous slurry. This slurry was kneaded with a small kneader at a temperature of 160° C. for about 60 minutes while melting the polymers. The resultant kneaded mixture was sandwiched between metal plates cooled at 0° C. to thereby form the mixture into a sheet while rapidly cooling it. This resin sheet was hot-pressed at a temperature of 115° C. until the sheet thickness decreased to 0.4 to 0.6 mm, and then biaxially stretched at a temperature of 115° C. simultaneously in the machine and transverse directions 3.5 times each. The stretched sheet was subjected to a solvent extraction with heptane. The microporous film thus obtained was heat-treated in air first at 95° C. for 6 hours and then at 115° C. for 2 hours to obtain a microporous film according to the invention.

EXAMPLE 3

Twenty parts by weight of a polymer composition consisting of 12% by weight powdery polymer formed by the ring-opening polymerization of norbornene and 88% by weight ultra high-molecular polyethylene having a weight-average molecular weight of 3,000,000 was mixed with 80 parts by weight of a liquid paraffin to prepare a homogeneous slurry. This slurry was kneaded with a small kneader at a temperature of 160° C. for about 60 minutes while melting the polymers. The resultant kneaded mixture was sandwiched between metal plates cooled at 0° C. to thereby form the mixture into a sheet while rapidly cooling it. This resin sheet was hot-pressed at a temperature of 115° C. until the sheet thickness decreased to 0.4 to 0.6 mm, and then biaxially stretched at a temperature of 115° C. simultaneously in the machine and transverse directions 3.5 times each. The stretched sheet was subjected to a solvent extraction with heptane. The microporous film thus obtained was heat-treated in air first at 95° C. for 3 hours and then at 120° C. for 2 hours to obtain a microporous film according to the invention.

EXAMPLE 4

The unheated microporous film obtained in Example 3 was heat-treated at 120° C. for 5 minutes and then irradiated with ultraviolet under the conditions of 1 J/cm$^2$ using a high-pressure mercury lamp to obtain a microporous film according to the invention.

Comparative Example 1

Film formation was conducted in the same manner as in Example 1, except that use was made of 20 parts by weight of a polymer composition consisting of 75% by weight ultrahigh-molecular polyethylene having a weight-average molecular weight of 3,000,000 and 25% by weight low-molecular polyethylene (manufactured by Mitsui Chemical Co., Ltd.; trade name, Hi-Wax 200P; molecular weight, 2,000) and 80 parts by weight of a liquid paraffin. The microporous film thus obtained was heat-treated in air at 115° C. for 2 hours to obtain a microporous film.

Comparative Example 2

Film formation was conducted in the same manner as in Example 1, except that use was made of 15 parts by weight of a polymer composition consisting of 67% by weight polyethylene having a weight-average molecular weight of 300,000 and 33% by weight ultrahigh-molecular polyethylene having a weight-average molecular weight of 3,000,000 and 85 parts by weight of a liquid paraffin The microporous film thus obtained was heat-treated in air at 115° C. for 2 hours to obtain a microporous film.

Comparative Example 3

The unheated microporous film obtained in Example 1 was heat-treated in air first at 85° C. for 20 minutes and then at 110° C. for 20 minutes to obtain a microporous film.

Properties of the microporous films obtained in Examples 1 to 4 and Comparative Examples 1 to 3 are shown in Table 1.

TABLE 1

| | Film thickness (μm) | Air permeability (sec/100 cc) | SD temperature (° C.) | Gel content (%) | Modulus of elasticity (Pa) | Thermal film breakage |
|---|---|---|---|---|---|---|
| Example 1 | 24 | 330 | 129 | 58 | 6.7 × 10$^6$ | not occurred |

TABLE 1-continued

| | Film thickness (μm) | Air permeability (sec/100 cc) | SD temperature (° C.) | Gel content (%) | Modulus of elasticity (Pa) | Thermal film breakage |
|---|---|---|---|---|---|---|
| Example 2 | 25 | 380 | 131 | 65 | $4.3 \times 10^6$ | not occurred |
| Example 3 | 25 | 320 | 142 | 79 | $2.5 \times 10^7$ | not occurred |
| Example 4 | 25 | 310 | 142 | 80 | $2.2 \times 10^7$ | not occurred |
| Comparative Example 1 | 24 | 340 | 127 | 0 | $3.3 \times 10^6$ | having break holes |
| Comparative Example 2 | 25 | 410 | 129 | 0 | $3.1 \times 10^5$ | having break holes |
| Comparative Example 3 | 24 | 310 | 129 | 14 | $1.1 \times 10^7$ | having break holes |

The results given in Table 1 show that the microporous films obtained in Examples 1 to 4 each had a high air permeability, an SD temperature, a far higher gel content than the microporous films obtained in Comparative Examples 1 to 3, and a modulus of elasticity of $1 \times 10^6$ Pa or higher and was less apt to break even at high temperatures.

The microporous film of the invention is excellent in permeability and mechanical strength and has breakage resistance at high temperatures. Provided by using the microporous film are: a separator for highly safe nonaqueous-electrolyte batteries which does not readily break even under the pressure of the inside vaporized electrolyte; and a nonaqueous-electrolyte battery which employs the separator and is highly safe.

What is claimed is:

1. A separator for a non aqueous-electrolyte battery, which comprises a single-layer microporous film comprising a resin having a crosslinked structure, wherein the microporous film has a gel content of from 20 to 90% as determined through 3-hour immersion in boiling xylene and a modulus of elasticity as measured at 150° C. of from $1 \times 10^6$ to $1 \times 10^8$ Pa, said film having been formed from a resin and a crosslinkable ingredient in an amount of 1 to 50% by weight, wherein said crosslinkable ingredient is a polymer formed by ring-opening polymerization of an unsaturated condensed alicyclic compound or a derivative thereof.

2. A non aqueous-electrolyte battery comprising a separator comprising a single-layer microporous film comprising a resin having a crosslinked structure, wherein the microporous film has a gel content of from 20 to 90% as determined through 3-hour immersion in boiling xylene and a modulus of elasticity as measured at 150° C. of from $1 \times 10^6$ to $1 \times 10^8$ Pa, said film having been formed from a resin and a crosslinkable ingredient in an amount of 1 to 50% by weight, wherein said crosslinkable ingredient is a polymer formed by ring-opening polymerization of an unsaturated condensed alicyclic compound or a derivative thereof.

3. A method for manufacturing a separator for a nonaqueous-electrolyte battery, said separator comprising a single-layer microporous film comprising a resin having a crosslinked structure, the method comprising:

providing a resin composition comprising a resin and a crosslinkable ingredient in an amount of 1 to 50% by weight, wherein said crosslinkable ingredient is a polymer formed by ring-opening polymerization of an unsaturated condensed alicyclic compound or a derivative thereof;

forming the resin composition into a sheet;

stretching the sheet to form a film; and heating the film to form the microporous film having a crosslinked structure;

wherein the microporous film has a gel content of from 20 to 90% as determined through 3-hour immersion in boiling xylene and a modulus of elasticity as measured at 150° C. of from $1 \times 10^6$ to $1 \times 10^8$ Pa.

* * * * *